US009863350B2

(12) United States Patent
Nakamoto et al.

(10) Patent No.: US 9,863,350 B2
(45) Date of Patent: Jan. 9, 2018

(54) START CONTROL DEVICE OF HOMOGENEOUS-CHARGE COMPRESSION IGNITION ENGINE

(71) Applicant: Mazda Motor Corporation, Aki-gun, Hiroshima (JP)

(72) Inventors: Yoshihisa Nakamoto, Hiroshima (JP); Kota Maekawa, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 259 days.

(21) Appl. No.: 14/787,739

(22) PCT Filed: Apr. 24, 2014

(86) PCT No.: PCT/JP2014/002321
§ 371 (c)(1),
(2) Date: Oct. 28, 2015

(87) PCT Pub. No.: WO2014/181520
PCT Pub. Date: Nov. 13, 2014

(65) Prior Publication Data
US 2016/0076472 A1    Mar. 17, 2016

(30) Foreign Application Priority Data

May 8, 2013    (JP) .................................. 2013-098362

(51) Int. Cl.
*F02D 41/00*    (2006.01)
*F02D 41/06*    (2006.01)
(Continued)

(52) U.S. Cl.
CPC .............. *F02D 41/062* (2013.01); *F02B 1/12* (2013.01); *F02D 41/009* (2013.01);
(Continued)

(58) Field of Classification Search
CPC .... F02D 41/065; F02D 41/009; F02D 41/042; F02D 41/3035; F02D 2041/0095;
(Continued)

(56) References Cited

U.S. PATENT DOCUMENTS 6,340,016 B1 *   1/2002   Ueda ................... F02D 41/0025
                                                         123/305
6,600,980 B1 *   7/2003   Kraska .................. B60K 6/445
                                                          477/2
(Continued)

FOREIGN PATENT DOCUMENTS

JP            2012012993 A        1/2012

OTHER PUBLICATIONS

ISA Japanese Patent Office, Written Opinion Issued in Application No. PCT/JP2014/002321, dated Jul. 8, 2014, WIPO, 7 pages.
(Continued)

*Primary Examiner* — Hieu T Vo
*Assistant Examiner* — Sherman Manley
(74) *Attorney, Agent, or Firm* — Alleman Hall Creasman & Tuttle LLP

(57) ABSTRACT

When a predetermined restart condition is satisfied after an engine is automatically stopped, whether or not a piston of a stopped-in-compression-stroke cylinder which is in a compression stroke falls within a specific range set at a bottom dead center side of a predetermined upper limit position is determined. When the piston of the stopped-in-compression-stroke cylinder falls within the specific range, a first compression start is executed in which fuel is injected from an injector into the stopped-in-compression-stroke cylinder for the first time and is then self-ignited. In the first compression start, a start timing of a first fuel injection operation with respect to the stopped-in-compression-stroke cylinder is set to be earlier as a stop position of the piston of
(Continued)

the cylinder gets closer to the bottom dead center within the specific range.

11 Claims, 7 Drawing Sheets

(51) Int. Cl.
*F02B 1/12* (2006.01)
*F02D 41/04* (2006.01)
*F02D 41/30* (2006.01)
*F02N 11/08* (2006.01)
*F02N 99/00* (2010.01)
*F02B 23/10* (2006.01)
*F02N 19/00* (2010.01)
*F02D 41/38* (2006.01)

(52) U.S. Cl.
CPC ......... *F02D 41/042* (2013.01); *F02D 41/065* (2013.01); *F02D 41/3035* (2013.01); *F02N 11/0814* (2013.01); *F02N 99/006* (2013.01); *F02B 23/101* (2013.01); *F02D 2041/0095* (2013.01); *F02D 2041/389* (2013.01); *F02N 19/005* (2013.01); *Y02T 10/128* (2013.01); *Y02T 10/48* (2013.01)

(58) Field of Classification Search
CPC ........... F02D 2041/389; F02N 11/0814; F02N 99/006; F02N 19/005; F02B 1/12; F02B 23/101; Y02T 10/48; Y02T 10/128
See application file for complete search history.

(56) References Cited

U.S. PATENT DOCUMENTS

| | | | | |
|---|---|---|---|---|
| 6,772,723 B2* | 8/2004 | Aoki | ...................... | B60K 6/485 |
| | | | | 123/179.4 |
| 7,083,020 B2* | 8/2006 | Morimoto | .............. | B60K 6/485 |
| | | | | 180/287 |
| 7,171,949 B2* | 2/2007 | Yamashita | .............. | F02P 3/045 |
| | | | | 123/406.59 |
| 8,504,279 B2* | 8/2013 | Ishikawa | ................. | F02D 17/00 |
| | | | | 123/179.25 |
| 8,700,243 B2* | 4/2014 | Kamijo | ............... | F02N 11/0844 |
| | | | | 180/65.265 |
| 9,097,200 B2* | 8/2015 | Yamauchi | ........... | F02D 41/0005 |
| 2004/0133333 A1* | 7/2004 | Surewaard | ............ | F02D 41/042 |
| | | | | 701/99 |
| 2005/0109302 A1* | 5/2005 | Tetsuno | ................ | F02D 41/042 |
| | | | | 123/179.5 |
| 2005/0221952 A1* | 10/2005 | Tetsuno | .............. | F02N 11/0814 |
| | | | | 477/115 |
| 2007/0078040 A1* | 4/2007 | Nobumoto | ............ | B60W 10/06 |
| | | | | 477/70 |
| 2007/0199533 A1* | 8/2007 | Takahashi | ............... | F02D 17/04 |
| | | | | 123/179.4 |
| 2007/0204830 A1* | 9/2007 | Andri | ..................... | B60K 6/445 |
| | | | | 123/198 F |
| 2007/0233357 A1* | 10/2007 | Sugai | ....................... | B60K 6/48 |
| | | | | 701/105 |
| 2009/0070020 A1* | 3/2009 | Tetsuno | ................ | F02D 35/026 |
| | | | | 701/113 |
| 2009/0271095 A1* | 10/2009 | Kojima | ............... | F02N 11/0814 |
| | | | | 701/113 |
| 2010/0000487 A1* | 1/2010 | Hoshino | ............... | F02D 35/025 |
| | | | | 123/179.4 |
| 2012/0143469 A1* | 6/2012 | Gwon | ................. | F02N 11/0837 |
| | | | | 701/102 |
| 2013/0080036 A1* | 3/2013 | Yamauchi | ............ | F02D 41/042 |
| | | | | 701/112 |
| 2013/0080039 A1* | 3/2013 | Nakamoto | ........... | F02D 41/009 |
| | | | | 701/113 |
| 2013/0206105 A1* | 8/2013 | Ando | ....................... | F01L 1/34 |
| | | | | 123/348 |

OTHER PUBLICATIONS

ISA Japanese Patent Office, International Search Report Issued in Application No. PCT/JP2014/002321, dated Jul. 8, 2014, WIPO, 1 page.

* cited by examiner

START CONTROL DEVICE OF HOMOGENEOUS-CHARGE COMPRESSION IGNITION ENGINE

TECHNICAL FIELD

The present invention relates to a start control device provided for an engine capable of performing homogeneous-charge compression ignition combustion in which fuel injected into a cylinder before compression top dead center is mixed with air, and the mixture is self-ignited by compression of a piston.

BACKGROUND ART

Conventionally, in the field of gasoline engines, a general combustion method (spark ignition combustion) is a method in which a fuel-air mixture is forcibly ignited by spark ignition of a spark plug. However, in recent years, instead of the spark ignition combustion, studies of applying so-called homogeneous-charge compression ignition combustion to the gasoline engines have been undertaken. According to the homogeneous-charge compression ignition combustion, fuel injected into a cylinder before compression top dead center is mixed with air, and the prepared air-fuel mixture is ignited by itself (not by the spark ignition) under a high-temperature environment generated by compression of a piston. According to the homogeneous-charge compression ignition combustion, plural combustion phenomena of the air-fuel mixture simultaneously occur in the cylinder. Therefore, it is said that a combustion period of the homogeneous-charge compression ignition combustion is shorter than a combustion period of the combustion by the spark ignition, and a heat efficiency of the homogeneous-charge compression ignition combustion is higher than a heat efficiency of the combustion by the spark ignition. Hereinafter, the homogeneous-charge compression ignition combustion may be abbreviated as HCCI combustion.

To further improve fuel efficiency of a homogeneous-charge compression ignition engine, it is effective to execute a so-called idling stop control of automatically stopping and restarting the engine.

One known technology regarding the above idling stop control is, for example, PTL 1 below. PTL 1 discloses that in a multi-cylinder diesel engine which combusts light oil by compression ignition (diffusion combustion) or in a multi-cylinder gasoline engine which combusts gasoline by compression ignition (homogeneous-charge combustion), a control mode when restarting the engine is changed based on a stop position of the piston of a specific cylinder.

Specifically, in PTL 1, when the engine is automatically stopped, a stop position of a piston of a stopped-in-compression-stroke cylinder that is in a compression stroke at that time is examined. When a restart condition of the engine is satisfied, whether or not the stop position of the piston of the stopped-in-compression-stroke cylinder is located at a bottom dead center side of a predetermined position is determined. When the stop position of the piston of the stopped-in-compression-stroke cylinder is located at the bottom dead center side of the predetermined position, the fuel is firstly injected into the stopped-in-compression-stroke cylinder, and the engine is started by restarting the combustion from first compression in which the compression top dead center is reached for the first time in the entire engine, that is, by restarting the combustion from the cylinder in which the compression top dead center is firstly reached among all the cylinders (four cylinders in PTL 1) (hereinafter referred to as a "first compression start").

In contrast, when the stop position of the piston of the stopped-in-compression-stroke cylinder is located at a top dead center side of the predetermined position, the fuel is firstly injected into a cylinder (stopped-in-intake-stroke cylinder), which is in an intake stroke when the engine is stopped, after the stopped-in-intake-stroke cylinder shifts to the compression stroke. Thus, the engine is started by restarting the combustion from second compression in which the compression top dead center is reached for a second time in the entire engine, that is, by restarting the combustion from the cylinder in which the compression top dead center is secondly reached among all the cylinders (hereinafter referred to as a "second compression start").

CITATION LIST

Patent Literature

PTL 1: Japanese Laid-Open Patent Application Publication No. 2012-012993

SUMMARY OF INVENTION

Technical Problem

According to the technology of PTL 1, when the piston of the stopped-in-compression-stroke cylinder is located at the bottom dead center side, the engine can be quickly restarted by the first compression start in which the fuel is injected from the first compression. In contrast, when the piston of the stopped-in-compression-stroke cylinder is located at the top dead center side, the engine can be surely restarted by the second compression start in which the fuel is injected from not the first compression but the second compression. Thus, misfire of the fuel is prevented while sacrificing the quickness of the start to some degree.

To respond to a demand for restarting the engine as quickly as possible, it is especially desirable to control the combustion such that a combustion gravity center (a timing at which 50% of the fuel in the cylinder finishes combusting) is reached when the piston slightly passes through the top dead center in the cylinder in which the first combustion is performed (i.e., in the stopped-in-compression-stroke cylinder at a time of the first compression start or in the stopped-in-intake-stroke cylinder at the time of the second compression start). With this, a push-down force applied to the piston by an expansion force of the combustion efficiently biases the piston, and this adequately increases the speed of the piston.

However, it is not easy to control the timing of the combustion with an adequately high degree of accuracy when restarting the engine after the engine is automatically stopped. Especially, according to the homogeneous-charge compression ignition engine which performs the compression ignition after the gasoline is mixed with the air, an ignition delay time that is a time from when the gasoline is injected into the cylinder until the gasoline is ignited varies widely depending on circumstances in the cylinder. Therefore, to set ignition timings of the air-fuel mixture to be similar to one another, some kind of solution is required. However, PTL 1 does not describe such a solution, so there is still room for improvement.

The present invention was made in light of the above circumstances, and an object of the present invention is to provide a start control device of a homogeneous-charge compression ignition engine, the start control device being capable of improving the quickness of the start of the engine by efficiently transmitting expansion energy of combustion to a piston when restarting the engine after the engine is automatically stopped.

Solution to Problem

To solve the above problems, the present invention is a start control device provided at a homogeneous-charge compression ignition engine, the homogeneous-charge compression ignition engine including a plurality of cylinders, pistons provided at the respective cylinders so as to reciprocate, and injectors configured to inject fuel to the respective cylinders, the homogeneous-charge compression ignition engine performing homogeneous-charge compression ignition combustion in which the fuel injected into the cylinder from the injector before compression top dead center is mixed with air and is then self-ignited by compression of the piston, the start control device including: an automatic stop control portion configured to automatically stop the engine when a predetermined automatic stop condition is satisfied; a stop position determining portion configured to determine whether or not the piston of a stopped-in-compression-stroke cylinder that is the cylinder which is in a compression stroke at the automatic stop of the engine falls within a specific range set at a bottom dead center side of a predetermined upper limit position; and a restart control portion configured to execute a first compression start when it is determined that the piston of the stopped-in-compression-stroke cylinder is stopped within the specific range and a predetermined restart condition is satisfied, the first compression start being a start in which the fuel is injected into the stopped-in-compression-stroke cylinder from the injector for the first time and is then self-ignited, and combustion is restarted from when the compression stroke is achieved for the first time in the entire engine, wherein the restart control portion sets a start timing of a first fuel injection operation with respect to the stopped-in-compression-stroke cylinder to be earlier as a stop position of the piston of the stopped-in-compression-stroke cylinder gets closer to the bottom dead center within the specific range.

According to the present invention, at the time of the first compression start in which the fuel is injected into the stopped-in-compression-stroke cylinder for the first time and is self-ignited, the start timing of the first fuel injection operation is set to be earlier as the stop position of the piston of the stopped-in-compression-stroke cylinder gets closer to the bottom dead center, that is, as a compression allowance of the piston (i.e., a stroke amount from the stop position of the piston to the compression top dead center) is larger. As a result, a timing at which the increase in temperature in the cylinder slows down by the latent heat of the vaporization of the injected fuel becomes earlier. As above, when a condition is such that the temperature in the cylinder easily increases, the start timing of the fuel injection operation is adjusted such that the temperature increase is suppressed. Therefore, even if the stop position of the piston of the stopped-in-compression-stroke cylinder varies in the range (specific range) where the first compression start can be executed, the timing at which the temperature in the cylinder increases to reach a temperature (ignition start temperature) necessary for the self-ignition of the air-fuel mixture can be set to the vicinity of a specific crank angle (for example, the vicinity of the compression top dead center). With this, for example, the air-fuel mixture can always be combusted at the timing at which the expansion energy by the combustion is most efficiently transmitted to the piston. Thus, the piston can be powerfully pushed down, and therefore, high rotational force can be applied to the engine. Thus, the quickness when restarting the engine can be effectively improved.

In the present invention, preferably, the restart control portion sets at least the start timing of the first fuel injection operation with respect to the stopped-in-compression-stroke cylinder among start timings of fuel injection operations at the time of the first compression start to such a timing that a combustion gravity center of the compression ignition combustion in the stopped-in-compression-stroke cylinder falls within 5±5° CA after a compression top dead center.

Here, the combustion gravity center denotes a timing at which 50% of the fuel injected into the cylinder finishes combusting. When this timing (combustion gravity center) falls within 5±5° CA after the compression top dead center, the expansion energy by the combustion can be highly efficiently converted into the push-down force of the piston, and therefore, a piston speed can be adequately increased.

In the present invention, preferably, the restart control portion sets at least an amount of fuel injected into the stopped-in-compression-stroke cylinder for the first time among amounts of fuel injected at the time of the first compression start to such an amount that an equivalent ratio of an air-fuel mixture in the cylinder becomes one.

According to this configuration, the first combustion in the stopped-in-compression-stroke cylinder becomes a highly-efficient combustion at the theoretical air-fuel ratio. Therefore, the high rotational force can be applied to the engine by the first combustion, and this can further improve the quickness of the start.

In the present invention, preferably, when the stop position of the piston of the stopped-in-compression-stroke cylinder stays at a same position within the specific range, the restart control portion sets at least the start timing of the first fuel injection operation with respect to the stopped-in-compression-stroke cylinder among start timings of fuel injection operations at the time of the first compression start to be earlier as a temperature of coolant of the engine becomes higher.

When the temperature of the coolant of the engine is high, an initial temperature of the air compressed in the cylinder becomes high. Therefore, in order to increase the cylinder internal temperature in the vicinity of the compression top dead center to a substantially constant temperature, the start timing of the fuel injection operation needs to be set to be earlier, and the increase speed of the cylinder internal temperature needs to be suppressed from an earlier timing based on the fuel injection operation. In consideration of this, according to the above configuration, the start timing of the fuel injection operation is set to be earlier as the temperature of the coolant of the engine becomes higher. With this, even if the temperature of the coolant slightly varies, the air-fuel mixture can always be combusted at a proper timing, and the expansion energy due to the combustion can be efficiently transmitted to the piston.

In the present invention, it is preferable that when it is determined that the piston of the stopped-in-compression-stroke cylinder is stopped at a top dead center side of the upper limit position, the restart control portion executes a second compression start in which: after a stopped-in-intake-stroke cylinder that is the cylinder which is in an intake stroke at the automatic stop of the engine is shifted to the compression stroke, the fuel is injected for the first time into the stopped-in-intake-stroke cylinder and is then self-ignited; and the combustion is restarted from when the compression stroke is achieved for a second time in the entire engine.

According to this configuration, in a state where the compression allowance cannot be adequately secured since the piston of the stopped-in-compression-stroke cylinder is relatively close to the top dead center, the fuel is injected for the first time into not the stopped-in-compression-stroke cylinder but the stopped-in-intake-stroke cylinder and is self-ignited, the stopped-in-intake-stroke cylinder executing the compression stroke after the compression stroke of the stopped-in-compression-stroke cylinder. Therefore, the engine can be surely restarted without causing misfire.

Advantageous Effects of Invention

As explained above, according to the start control device of the homogeneous-charge compression ignition engine of the present invention, at the time of the restart after the engine is automatically stopped, the expansion energy by the combustion can be efficiently transmitted to the piston. Therefore, the quickness of the start can be improved.

DESCRIPTION OF EMBODIMENTS (1) Entire Configuration of Engine

Figure 1:
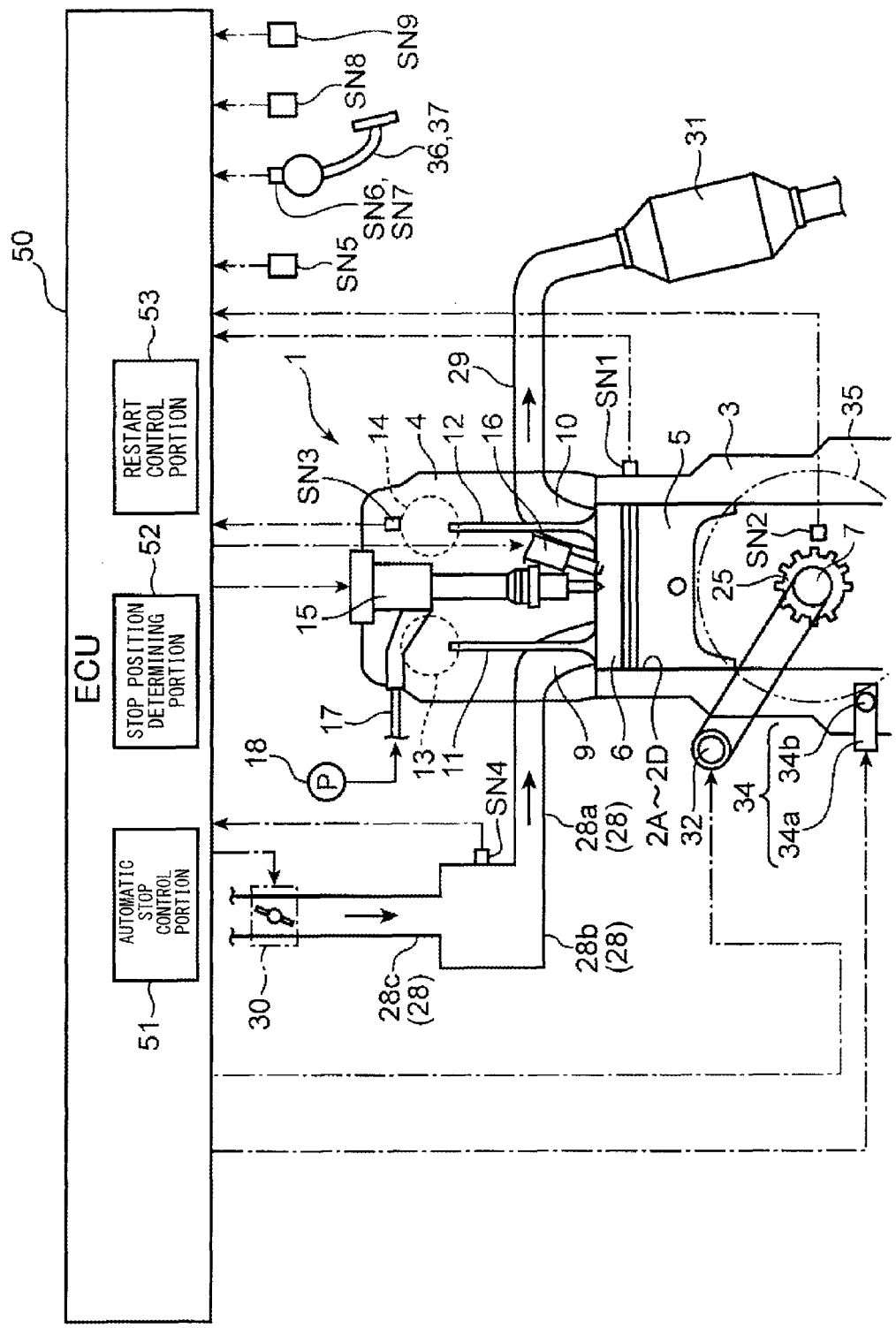
FIG. 1 is a diagram showing an entire configuration of a homogeneous-charge compression ignition engine to which a start control device according to one embodiment of the present invention is applied.

FIG. 1 is a diagram showing an entire configuration of a homogeneous-charge compression ignition engine to which a start control device according to one embodiment of the present invention is applied. The engine shown in FIG. 1 is a four cycle gasoline engine mounted on a vehicle as a power source for traveling. Specifically, the engine includes an inline four cylinder engine main body 1, an intake passage 28, and an exhaust passage 29. The engine main body 1 includes a plurality of cylinders 2A to 2D (also see FIG. 3 described later) lined up in a row in a direction perpendicular to a paper surface of FIG. 1. The intake passage 28 introduces air to the engine main body 1. The exhaust passage 29 discharges an exhaust gas generated by the engine main body 1.

The engine main body 1 includes a cylinder block 3, a cylinder head 4, and pistons 5. The plurality of cylinders 2A to 2D are formed in the cylinder block 3. The cylinder head 4 is provided at an upper portion of the cylinder block 3. The pistons 5 are inserted into the respective cylinders 2A to 2D so as to be able to reciprocate and slide.

A combustion chamber 6 is formed above each piston 5. Fuel injected from a below-described injector 15 is supplied to the combustion chamber 6. The injected fuel is combusted in the combustion chamber 6, and the piston 5 pushed down by expansion force of the combustion reciprocates in an upward/downward direction. Since the engine of the present embodiment is a gasoline engine, gasoline is used as the fuel. However, the entire fuel does not have to be gasoline, and the fuel may contain subcomponents, such as alcohol.

The piston 5 is coupled to a crank shaft 7 through a connecting rod (not shown). The crank shaft 7 is an output shaft of the engine main body 1. The crank shaft 7 rotates around a central axis in accordance with the reciprocating movement of the piston 5.

A geometrical compression ratio of each of the cylinders 2A to 2D, that is, a ratio of a volume of the combustion chamber 6 when the piston 5 is located at a bottom dead center and a volume of the combustion chamber 6 when the piston 5 is located at a top dead center is set to not less than 18 and not more than 50, that is, a value which is relatively high as the geometrical compression ratio of the gasoline engine. This is because to realize the HCCI combustion (homogeneous-charge compression ignition combustion) in which the gasoline is combusted by self-ignition, the combustion chamber 6 needs to be significantly increased in temperature and pressure.

In the four cycle and inline-four-cylinder engine shown in FIG. 1, the pistons 5 provided at the respective cylinders 2A to 2D vertically move with a phase difference of 180° in crank angle (180° CA). Therefore, at the time of a normal operation of the engine, timings of combustion operations of the respective cylinders 2A to 2D (i.e., timings of fuel injection operations for the combustion operations) are set to be different in phase basically by 180° CA from one another. Specifically, the cylinders 2A, 2B, 2C, and 2D are lined up in this order in a direction from a near side of the paper surface of FIG. 1 toward a far side of the paper surface of FIG. 1, and these cylinders 2A, 2B, 2C, and 2D are referred to as the first, second, third, and fourth cylinders, respectively. The combustion operations are performed in order of the first cylinder 2A, the third cylinder 2C, the fourth cylinder 2D, and the second cylinder 2B (also see FIG. 4 described later). Therefore, for example, when the first cylinder 2A is in an expansion stroke, the third cylinder 2C, the fourth cylinder 2D, and the second cylinder 2B are in a compression stroke, an intake stroke, and an exhaust stroke, respectively.

The cylinder head 4 is provided with intake ports 9, exhaust ports 10, intake valves 11, and exhaust valves 12. The intake ports 9 introduce the air, supplied from the intake passage 28, to the combustion chambers 6 of the cylinders 2A to 2D. The exhaust ports 10 lead out the exhaust gas, generated in the combustion chambers 6 of the cylinders 2A to 2D, to the exhaust passage 29. The intake valves 11 open and close openings of the intake ports 9, each of the openings being located at the combustion chamber 6 side. The exhaust valves 12 open and close openings of the exhaust ports 10, each of the openings being located at the combustion chamber 6 side.

The intake valve 11 is opened and closed by a valve operating mechanism 13 in conjunction with the rotation of the crank shaft 7, the valve operating mechanism 13 including a pair of camshafts provided at the cylinder head 4, and the like. The exhaust valve 12 is opened and closed by a valve operating mechanism 14 in conjunction with the rotation of the crank shaft 7, the valve operating mechanism 14 including a pair of camshafts provided at the cylinder head 4, and the like.

The cylinder head 4 is provided with the injectors 15 and spark plugs 16, and one injector 15 and one spark plug 16 are provided for each of the cylinders 2A to 2D. The injector 15 injects the fuel (gasoline) into the combustion chamber 6. The spark plug 16 supplies ignition energy, generated by spark discharge, to an air-fuel mixture that is a mixture of the air and the fuel injected from the injector 15. The engine of the present embodiment basically executes the HCCI combustion in which the air-fuel mixture is self-ignited by the compression of the piston 5. Therefore, the spark plug 16 operates only when it is impossible or difficult to execute the HCCI combustion (for example, when a temperature of coolant of the engine is significantly low). Basically, the spark plug 16 does not operate when the HCCI combustion is executed.

The injector 15 is provided at the cylinder head 4 in such a posture as to face an upper surface of the piston 5. Fuel supply pipes 17 are connected to the respective injectors 15 of the cylinders 2A to 2D. The fuel (gasoline) supplied through the fuel supply pipe 17 is injected from a plurality of injection holes (not shown) provided at a tip end portion of the injector 15.

More specifically, a supply pump 18 is provided upstream of the fuel supply pipe 17 and is constituted by, for example, a plunger pump driven by the engine main body 1. A common rail (not shown) for pressure accumulation is provided for the cylinders 2A to 2D and is located between the supply pump 18 and the fuel supply pipe 17. The fuel whose pressure is accumulated in the common rail is supplied to the injectors 15 of the cylinders 2A to 2D, so that each of the injectors 15 can inject the fuel at high pressure of not less than 20 MPa.

An alternator 32 is coupled to the crank shaft 7 through a belt and the like. The alternator 32 includes a regulator circuit which controls a current (field current), applied to a field coil (not shown), to adjust an electric power generation amount. The alternator 32 obtains driving force from the crank shaft 7 to generate electric power while adjusting the field current based on a target electric power generation amount determined in accordance with an electric load of a vehicle, a remaining capacity of a battery, and the like.

The cylinder block 3 is provided with a starter motor 34 which starts the engine. The starter motor 34 includes a motor main body 34a and a pinion gear 34b rotated by the motor main body 34a. The pinion gear 34b separably meshes with a ring gear 35 coupled to one end portion of the crank shaft 7. When starting the engine by using the starter motor 34, the pinion gear 34b moves to a predetermined meshing position to mesh with the ring gear 35, and a rotational force of the pinion gear 34b is transmitted to the ring gear 35. Thus, the crank shaft 7 is rotated.

The intake passage 28 includes a common passage portion 28c, a surge tank 28b, and a plurality of independent passage portions 28a (FIG. 1 shows only one independent passage portion 28a). The surge tank 28b is connected to a downstream end portion of the common passage portion 28c and has a predetermined volume. The plurality of independent passage portions 28a extend from the surge tank 28b toward a downstream side and communicate with the respective intake ports 9 of the cylinders 2A to 2D.

A throttle valve 30 is provided at the common passage portion 28c of the intake passage 28 so as to vary a communication cross-sectional area in the common passage portion 28c. The throttle valve 30 is configured as an electric type so as to be operable without being linked with an opening degree of an accelerator pedal 36 pressed and operated by a driver. To be specific, the throttle valve 30 includes: a butterfly valve main body provided in the common passage portion 28c; and an electric actuator configured to open and close the valve main body.

Although not shown in detail, the exhaust passage 29 includes a plurality of independent passage portions, an exhaust collecting portion, and a common passage portion. The plurality of independent passage portions communicate with the respective exhaust ports 10 of the cylinders 2A to 2D. The exhaust collecting portion is a portion at which downstream end portions of the independent passage portions are collected. The common passage portion extends from the exhaust collecting portion toward a downstream side.

A catalyst converter 31 is provided at the exhaust passage 29 (more specifically, at the common passage portion). The catalyst converter 31 includes a catalyst constituted by, for example, a three way catalyst. The catalyst converter 31 has a function of purifying harmful components (HC, CO, and NOx) contained in an exhaust gas flowing through the exhaust passage 29.

(2) Control System

Next, a control system of the engine will be explained. Respective portions of the engine of the present embodiment are integrally controlled by an ECU (engine control unit) 50. As is well known, the ECU 50 is constituted by a microprocessor including a CPU, a ROM, a RAM, etc.

The engine or the vehicle is provided with a plurality of sensors which detects state quantities of respective portions of the engine or the vehicle, and information pieces from the sensors are input to the ECU 50.

For example, water jackets (not shown) through which the coolant flows are provided in the cylinder block 3 and the cylinder head 4. A water temperature sensor SN1 configured to detect the temperature of the coolant in the water jacket is provided at the cylinder block 3.

A crank angle sensor SN2 configured to detect a rotation angle and rotating speed of the crank shaft 7 is provided at the cylinder block 3. The crank angle sensor SN2 outputs a pulse signal in accordance with the rotation of a crank plate 25 which rotates integrally with the crank shaft 7. The rotation angle (crank angle) and rotating speed (engine rotating speed) of the crank shaft 7 are detected based on this pulse signal.

A cam angle sensor SN3 configured to output a cylinder determination information piece is provided at the cylinder head 4. To be specific, the cam angle sensor SN3 outputs a pulse signal in accordance with passing of a tooth of a signal plate which rotates integrally with the camshaft. The stroke of each cylinder is determined based on the pulse signal from the cam angle sensor SN3 and the pulse signal from the crank angle sensor SN2.

An air flow sensor SN4 configured to detect the amount (intake air amount) of air taken in each of the cylinders 2A to 2D of the engine main body 1 is provided at the surge tank 28b of the intake passage 28.

The vehicle is provided with a vehicle speed sensor SN5, an accelerator opening degree sensor SN6, a brake sensor SN7, a battery sensor SN8, and an interior temperature sensor SN9. The vehicle speed sensor SN5 detects a traveling speed (vehicle speed) of the vehicle. The accelerator opening degree sensor SN6 detects the opening degree (accelerator opening degree) of the accelerator pedal 36. The brake sensor SN7 detects ON and OFF operations of a brake pedal 37 (i.e., the application of the brake). The battery sensor SN8 detects the remaining capacity of the battery (not shown). The interior temperature sensor SN9 detects the temperature of an interior of the vehicle.

The ECU 50 is electrically connected to the sensors SN1 to SN9 and obtains the above-described various information pieces (the temperature of the coolant of the engine, the crank angle, the rotating speed, etc.) based on the signals input from the sensors.

The ECU 50 controls respective portions of the engine while executing various determinations, calculations, and the like based on the input signals from the sensors SN1 to SN9. To be specific, the ECU 50 is electrically connected to the injectors 15, the spark plugs 16, the throttle valve 30, the alternator 32, and the starter motor 34 and outputs drive control signals to these components based on results of the calculations and the like.

More specific functions of the ECU 50 will be explained. As specific functional components related to a so-called idling stop control, the ECU 50 includes an automatic stop control portion 51, a stop position determining portion 52, and a restart control portion 53.

During the operation of the engine, the automatic stop control portion 51 determines whether or not a predetermined engine automatic stop condition is satisfied. When the condition is satisfied, the automatic stop control portion 51 executes a control operation of automatically stopping the engine.

When the engine is automatically stopped, the stop position determining portion 52 specifies a position of the piston 5 of the cylinder which is in the compression stroke, and determines whether or not the specified position of the piston 5 falls within a specific range (below-described specific range Rx).

After the engine is automatically stopped, the restart control portion 53 determines whether or not a predetermined restart condition is satisfied. When the condition is satisfied, the restart control portion 53 executes a control operation of automatically restarting the engine.

(3) Automatic Stop/Restart Control

Next, a specific control procedure of the ECU 50 which performs the automatic stop/restart control of the engine will be explained in reference to a flow chart of FIG. 2.

Figure 2:
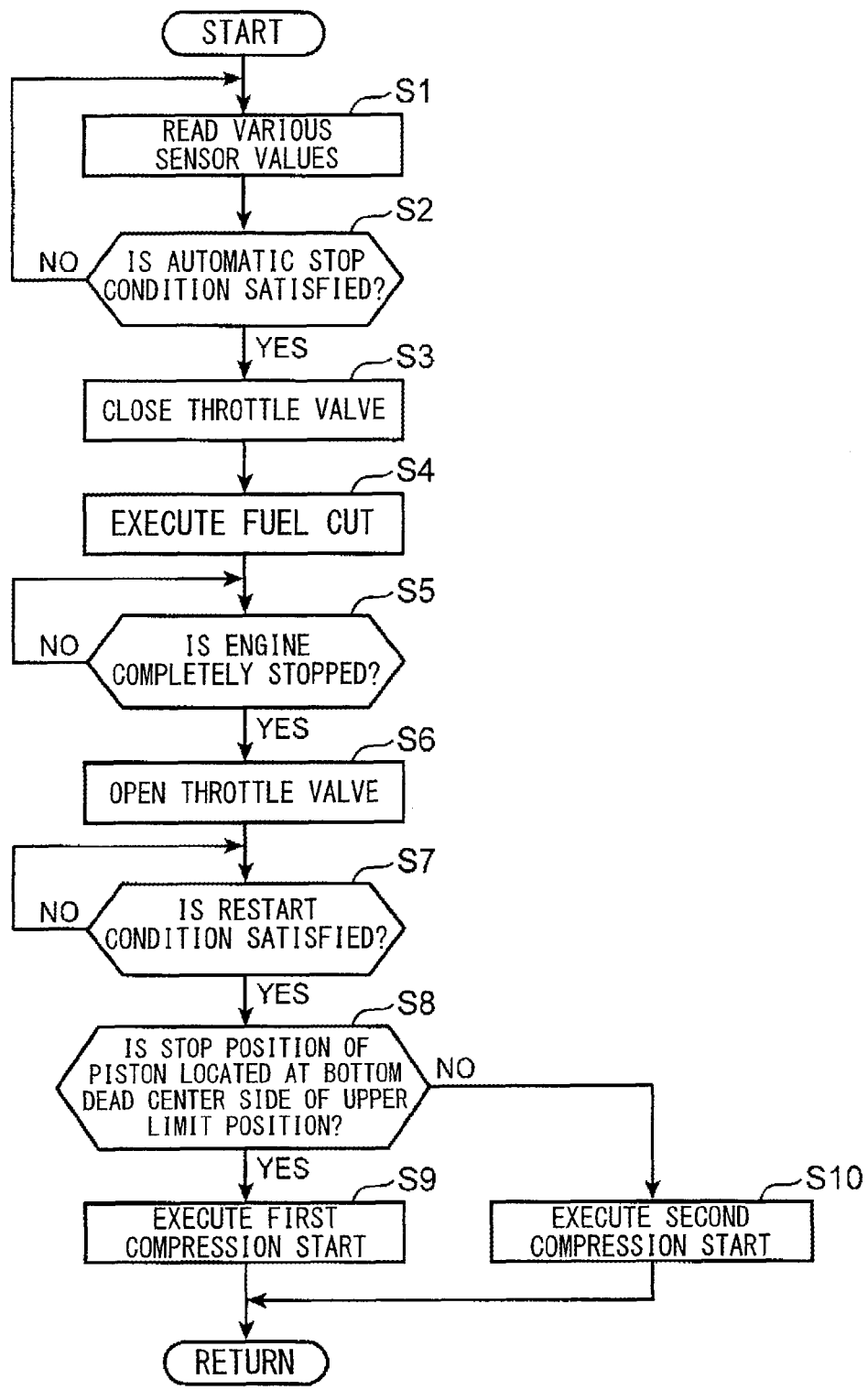
FIG. 2 is a flow chart showing a specific procedure of an automatic stop control and a restart control of the engine.

When a process shown in the flow chart of FIG. 2 is started, the ECU 50 executes an operation of reading various sensor values (Step S1). Specifically, the ECU 50 reads detection signals from the water temperature sensor SN1, the crank angle sensor SN2, the cam angle sensor SN3, the air flow sensor SN4, the vehicle speed sensor SN5, the accelerator opening degree sensor SN6, the brake sensor SN7, the battery sensor SN8, and the interior temperature sensor SN9. Based on these detection signals, the ECU 50 obtains various information pieces, such as the temperature of the coolant of the engine, the crank angle, the rotating speed, the cylinder determination information piece, the intake air amount, the vehicle speed, the accelerator opening degree, the application of the brake, the remaining capacity of the battery, and the interior temperature.

Next, based on the information pieces obtained in Step S1, the automatic stop control portion 51 of the ECU 50 determines whether or not the engine automatic stop condition is satisfied (Step S2). When all of a plurality of requisite conditions are satisfied, such as when the vehicle is in a stop state, the opening degree of the accelerator pedal 36 is zero (the accelerator is turned off), the brake pedal 37 is pressed (the brake is turned on), the temperature of the coolant of the engine is not less than a predetermined value (i.e., the engine is warmed up to some extent), the remaining capacity of the battery is not less than a predetermined value, and the load of the air conditioner (a difference between the interior temperature and a set temperature of the air conditioner) is relatively small, the automatic stop control portion 51 of the ECU 50 determines that the automatic stop condition is satisfied.

When the determination in Step S2 is YES, that is, when it is confirmed that the automatic stop condition is satisfied, the automatic stop control portion 51 reduces the opening degree of the throttle valve 30 from a normal opening degree set during idling to a predetermined low opening degree (such as 0%) (Step S3).

Next, the automatic stop control portion 51 executes a fuel cut operation of stopping the injection of the fuel from the injector 15 (Step S4). To be specific, a target injection amount that is the amount of fuel to be injected from each of the injectors 15 of the cylinders 2A to 2D is set to zero, and therefore, the fuel injection operations of all the injectors 15 are stopped. With this, the fuel cut is realized.

After the fuel cut, the engine temporarily rotates by inertia. However, the engine will eventually completely stop. To confirm the stop of the engine, the automatic stop control portion 51 determines whether or not the rotating speed of the engine is 0 rpm (Step S5). When the determination in Step 5 is YES, that is, when it is confirmed that the engine is completely stopped, the automatic stop control portion 51 increases the opening degree of the throttle valve 30 to a predetermined high opening degree (such as 80%) (Step S6).

Figure 3:
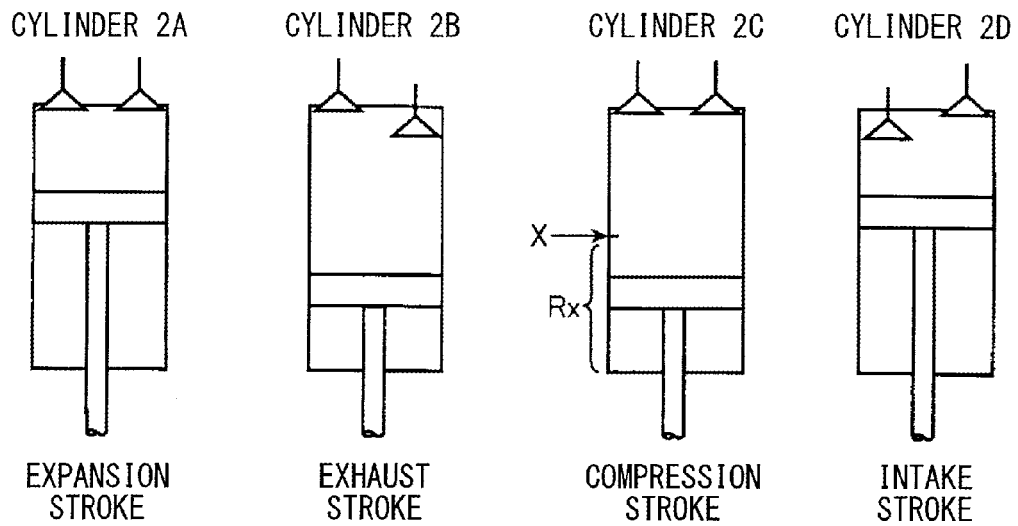
FIG. 3 is a diagram showing states of respective cylinders after the automatic stop control of the engine is terminated.

FIG. 3 shows states of the cylinders 2A to 2D of the engine after the above automatic stop control is terminated. In the example shown in FIG. 3, when the engine is stopped, the first cylinder 2A is in the expansion stroke, the second cylinder 2B is in the exhaust stroke, the third cylinder 2C is in the compression stroke, and the fourth cylinder 2D is in the intake stroke. Hereinafter, the cylinder which is stopped in the expansion stroke by the automatic stop control, the cylinder which is stopped in the exhaust stroke by the automatic stop control, the cylinder which is stopped in the compression stroke by the automatic stop control, and the cylinder which is stopped in the intake stroke by the automatic stop control may be referred to as an "stopped-in-expansion-stroke cylinder", an "stopped-in-exhaust-stroke cylinder", a "stopped-in-compression-stroke cylinder", and an "stopped-in-intake-stroke cylinder", respectively. For example, the cylinder 2A which is in the expansion stroke when the engine is stopped is referred to as an "stopped-in-expansion-stroke cylinder 2A", the cylinder 2B which is in the exhaust stroke when the engine is stopped is referred to as an "stopped-in-exhaust-stroke cylinder 2B", the cylinder 2C which is in the compression stroke when the engine is stopped is referred to as a "stopped-in-compression-stroke cylinder 2C", and the cylinder 2D which is in the intake stroke when the engine is stopped is referred to as an "stopped-in-intake-stroke cylinder 2D". A case where the engine stops in a state shown in FIG. 3 is just one example. The stroke of each of the cylinders 2A to 2D when the engine is stopped changes depending on situations. However, even in such cases, details of the below-explained control (control performed after the engine is automatically stopped) are always the same except that the cylinder numbers are different.

When the engine is completely stopped as above, the restart control portion 53 of the ECU 50 determines based on various sensor values whether or not the restart condition for the engine is satisfied (Step S7). When at least one of requisite conditions is satisfied, the restart control portion 53 of the ECU 50 determines that the restart condition is satisfied. Examples of the requisite conditions are a condition in which the brake pedal 37 is released, a condition in which the accelerator pedal 36 is pressed, a condition in which the temperature of the coolant of the engine is lower than a predetermined value, a condition in which a decreased amount of the remaining capacity of the battery exceeds an allowable value, a condition in which a stop time (time elapsed since the automatic stop) of the engine exceeds an upper limit, and a condition in which the operation of the air conditioner is required (i.e., a condition in which the difference between the interior temperature and the set temperature of the air conditioner exceeds an allowable value).

When the determination in Step S7 is YES, that is, when it is confirmed that the restart condition is satisfied, the stop position determining portion 52 of the ECU 50 specifies based on the crank angle sensor SN2 and the cam angle sensor SN3 the stop position of the piston of the cylinder (the stopped-in-compression-stroke cylinder 2C in FIG. 3) which is in the compression stroke at the automatic stop of the engine, and determines whether or not the specified stop position of the piston falls within the specific range Rx set at the bottom dead center side of an upper limit position X shown in FIG. 3 (more specifically, within a range between the upper limit position X and the bottom dead center, the range including the upper limit position X) (Step S8). The upper limit position X varies depending on the shape of the engine (displacement, bore/stroke ratio, etc.), the degree of progress of the engine warm-up, and the like. For example, the upper limit position X may be set at any position between 90° CA and 75° CA before a top dead center (BTDC).

When the determination in Step S8 is YES, that is, when it is confirmed that the stop position of the piston of the stopped-in-compression-stroke cylinder 2C falls within the specific range Rx, the restart control portion 53 of the ECU 50 restarts the engine by a first compression start in which the combustion of the air-fuel mixture is started from a first compression in which the compression top dead center is reached in the stopped-in-compression-stroke cylinder 2C (Step S9). To be specific, the restart control portion 53 drives the starter motor 34 to apply the rotational force to the crank shaft 7, and while the piston 5 of the stopped-in-compression-stroke cylinder 2C is moving up by the application of the rotational force to the crank shaft 7 (before the piston 5 reaches the compression top dead center), the restart control portion 53 causes the injector 15 to inject the fuel to the cylinder 2C. Then, the air-fuel mixture of the air and the fuel injected into the cylinder 2C is self-ignited in accordance with the compression of the piston 5. With this, the HCCI combustion is executed from the first compression in which the top dead center is reached for the first time in the entire engine. Thus, the engine is restarted.

In contrast, when the determination in Step S8 is NO, that is, when it is confirmed that the stop position of the piston of the stopped-in-compression-stroke cylinder 2C does not fall within the specific range Rx (i.e., when it is confirmed that the stop position of the piston of the stopped-in-compression-stroke cylinder 2C is located at the top dead center side of the upper limit position X), the restart control portion 53 restarts the engine by a second compression start in which the combustion of the air-fuel mixture is started from not the first compression in which the compression top dead center is reached in the stopped-in-compression-stroke cylinder 2C but the second compression in which the compression top dead center is reached in the stopped-in-intake-stroke cylinder 2D which is in the intake stroke (Step S10). To be specific, the restart control portion 53 rotates the crank shaft 7 only by the driving force of the starter motor 34 in a period from when the piston 5 of the stopped-in-intake-stroke cylinder 2D once moves down until when the piston 5 of the stopped-in-intake-stroke cylinder 2D moves up to reach the compression top dead center, and the restart control portion 53 causes the injector 15 to inject the fuel to the stopped-in-intake-stroke cylinder 2D while the piston 5 of the stopped-in-intake-stroke cylinder 2D is moving up (before the piston 5 of the stopped-in-intake-stroke cylinder 2D reaches the compression top dead center). Then, the air-fuel mixture of the air and the fuel injected into the cylinder 2D is self-ignited in accordance with the compression of the piston 5. With this, the HCCI combustion is executed from the second compression in which the top dead center is reached for the second time in the entire engine. Thus, the engine is restarted.

Although not explained in the flow chart (FIG. 2), a predetermined control operation may be performed during the automatic stop control of the engine (before the engine is completely stopped) such that the stop position of the piston of the stopped-in-compression-stroke cylinder (cylinder 2C in FIG. 3) which is in the compression stroke at the time of the automatic stop of the engine is located at the bottom dead center side within the specific range Rx with high probability. In the case of the second compression start, the combustion cannot be restarted until the second compression in which the piston 5 of the stopped-in-intake-stroke cylinder 2D reaches the vicinity of the compression top dead center. Therefore, a time necessary to restart the engine, that is, a time from when the starter motor 34 starts driving until complete combustion sequence (i.e., a state where the combustion is performed once in each of all the cylinders 2A to 2D) of the engine is achieved becomes slightly longer than that at the time of the first compression start. Therefore, in order that the first compression start can be executed with high probability, it is desirable to perform some sort of control operation such that the stop position of the piston falls within the specific range Rx.

For example, in the cylinders 2A to 2D, the last top dead center immediately before the engine stop is referred to as a final TDC. Here, it is possible to find out by an experiment or the like such a range of the engine rotating speed at the time of the final TDC or a range of the engine rotating speed at the time of the top dead center n times before the final TDC that the stop position of the piston of the stopped-in-compression-stroke cylinder falls within the specific range Rx. Therefore, one possible countermeasure is that: whether or not the engine rotating speed at the time of the final TDC or the engine rotating speed at the time of the top dead center n times before the final TDC falls within a predetermined speed range (i.e., such a speed range that the stop position of the piston falls within the specific range Rx) is determined; and when the engine rotating speed does not fall within the speed range, rotational resistance applied to the engine main body 1 is adjusted by increasing or decreasing the field current of the alternator 32. Another possible countermeasure is that by opening the throttle valve 30 at the time of the top dead center one time before the final TDC, the intake air amount with respect to the cylinder which is in the intake stroke at this time (in other words, the stopped-in-compression-stroke cylinder which is finally in the compression stroke) is increased; and by increasing compression reaction force generated in accordance with the compression of the air, the stop position of the piston of the stopped-in-compression-stroke cylinder is positioned at the bottom dead center side. By at least one of these countermeasures, the stop position of the piston of the stopped-in-compression-stroke cylinder can be almost forcibly caused to fall within the specific range Rx. Therefore, the quick engine restart by the first compression start can be realized with considerably high probability.

(4) Injection Control at the Time of the First Compression Start

Next, specific details of the fuel injection operation performed at the time of the engine restart by the first compression start (i.e., at the time of the first compression start) will be explained.

Figure 4:
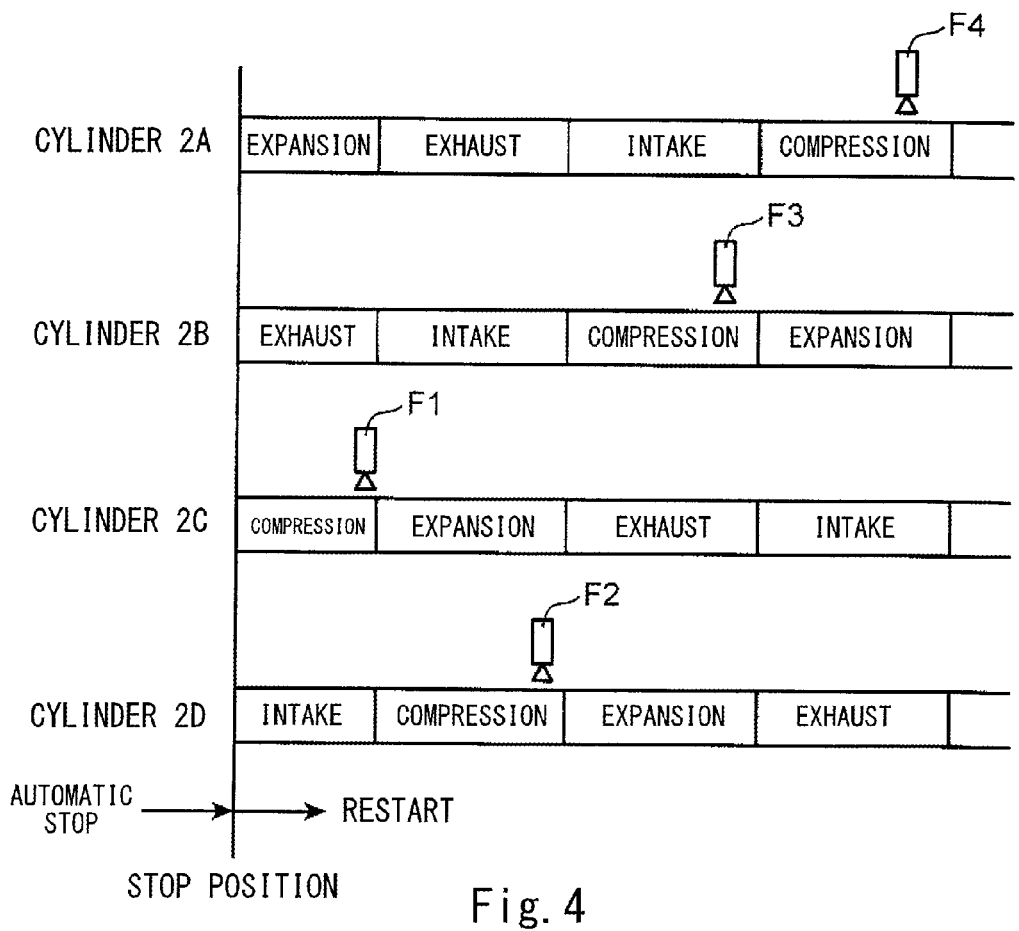
FIG. 4 is a diagram showing an order of fuel injection operations performed when a first compression start of the engine is executed.

FIG. 4 shows the changes in the strokes of the cylinders 2A to 2D at the time of the first compression start and the fuel injection operations executed with respect to the cylinders 2A to 2D. As shown in FIG. 4, at the time of the first compression start, the first fuel injection operation is executed with respect to the stopped-in-compression-stroke cylinder 2C (F1). After that, the fuel injection operations are executed with respect to the stopped-in-intake-stroke cylinder 2D, the stopped-in-exhaust-stroke cylinder 2B, and the stopped-in-expansion-stroke cylinder 2A in this order (F2, F3, and F4).

Figure 5:
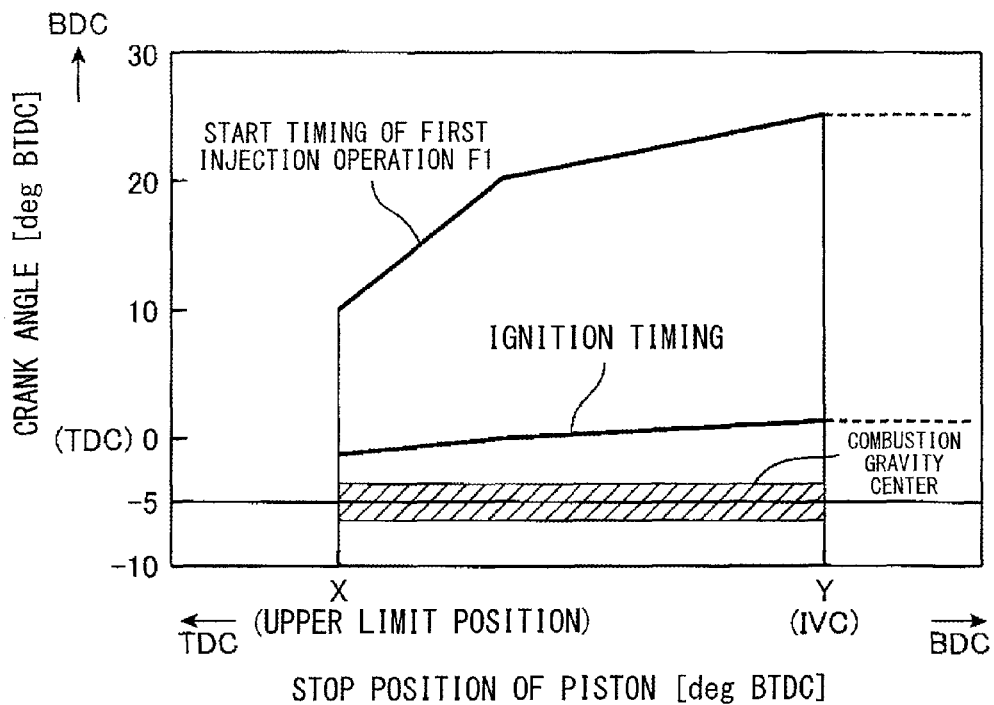
FIG. 5 is a graph showing a start timing of a first fuel injection operation of the first compression start in relation to a stop position of a piston of a stopped-in-compression-stroke cylinder.

FIG. 5 is a graph showing a start timing of the first fuel injection operation F1 with respect to the stopped-in-compression-stroke cylinder 2C at the time of the first compression start, in relation of the stop position of the piston of the stopped-in-compression-stroke cylinder 2C. As shown in FIG. 5, the start timing of the first fuel injection operation F1 is set to be earlier as the stop position of the piston of the stopped-in-compression-stroke cylinder 2C gets farther away from the upper limit position X (i.e., a limit stop position at which the first compression start is allowed) toward the bottom dead center (BDC) side. Specifically, in the example of FIG. 5, the start timing of the fuel injection operation F1 when the stop position of the piston is the upper limit position X is set to about 10° CA before the top dead center (BTDC), and the start timing of the fuel injection operation F1 when the stop position of the piston is a predetermined position Y away from the upper limit position X toward the bottom dead center side by a predetermined crank angle is set to about 25° CA before the top dead center. When the stop position of the piston is between the upper limit position X and the predetermined position Y, the start timing of the fuel injection operation F1 is set to a timing between 25° CA and 10° CA before the top dead center. Generally, the start timing of the fuel injection operation F1 is set to be earlier as the stop position of the piston gets closer to the predetermined position Y. It should be noted that the predetermined position Y is the crank angle corresponding to a close timing (IVC; Intake Valve Close Timing) of the intake valve 11, that is, the crank angle at which the air in the cylinder starts being practically compressed. Therefore, the start timing of the fuel injection operation F1 when the stop position of the piston is located at the bottom dead center side of the predetermined position Y is substantially the same as the start timing of the fuel injection operation F1 when the stop position of the piston is the predetermined position Y as shown by a broken line in FIG. 5.

Figure 6:
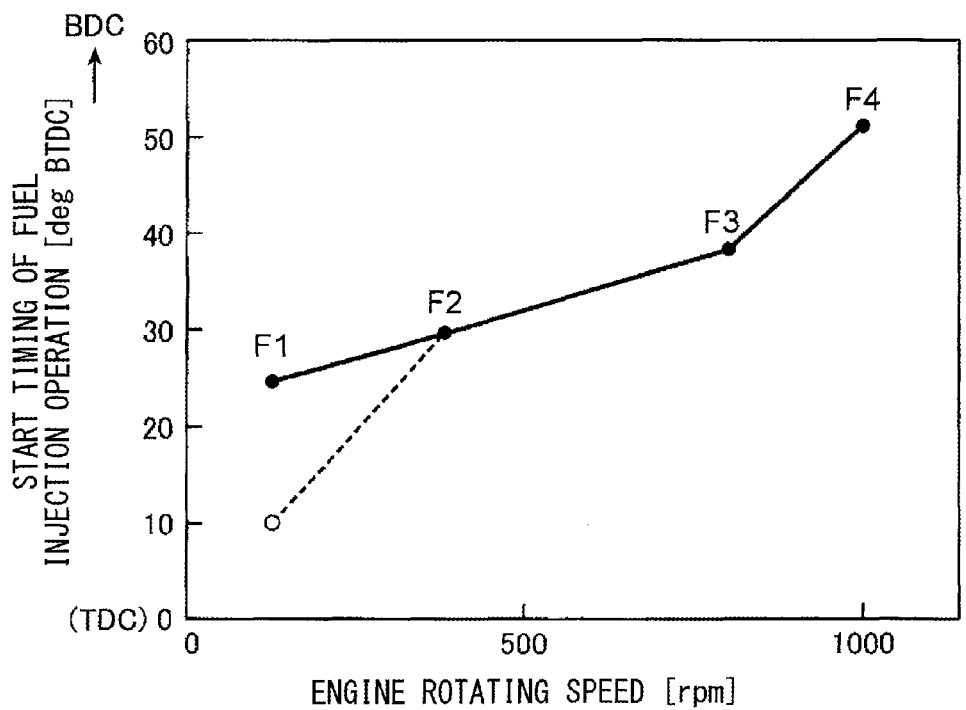
FIG. 6 is a graph showing: respective start timings of the fuel injection operations performed at the time of the first compression start; and respective engine rotating speeds at the time of the fuel injection operations.

FIG. 6 is a graph showing a relation between the engine rotating speed when the fuel is injected into each of the cylinders 2A to 2D at the time of the first compression start and the start timing of each of the fuel injection operations (F1 to F4). As shown in FIG. 6, when the fuel injection operation F1 with respect to the stopped-in-compression-stroke cylinder 2C that is the first fuel injection operation at the time of the first compression start is executed, the engine rotating speed is a speed (about 120 rpm, for example) slightly higher than 100 rpm, and the start timing of the fuel injection operation F1 at this time is set to a timing between 25° CA and 10° CA before the top dead center as explained above in FIG. 5. In FIG. 6, a case where the start timing of the fuel injection operation is set to about 25° CA before the top dead center is shown by a solid line, and a case where the start timing of the fuel injection operation is set to about 10° CA before the top dead center is shown by a broken line. When the fuel injection operation F1 is executed, the injected fuel is combusted by the self-ignition in the stopped-in-compression-stroke cylinder 2C (HCCI combustion), and this pushes down the piston 5. Thus, the rotating speed of the engine starts increasing. Therefore, the engine rotating speed when the second fuel injection operation F2 (i.e., the fuel injection operation with respect to the stopped-in-intake-stroke cylinder 2D) after the first fuel injection operation F1 is executed is higher than the engine rotating speed when the first fuel injection operation F1 is executed. Similarly, the engine rotating speed further increases as the fuel injection operations proceed in order of the third fuel injection operation F3 (i.e., the fuel injection operation with respect to the stopped-in-exhaust-stroke cylinder 2B) and the fourth fuel injection operation F4 (i.e., the fuel injection operation with respect to the stopped-in-expansion-stroke cylinder 2A). Then, in correlation to the increase in the engine rotating speed, the start timings of the respective fuel injection operations are shifted to earlier timings that are farther away from the compression top dead center. To be specific, the start timing of the second fuel injection operation F2 is set to be earlier than the start timing of the first fuel injection operation F1. Further, the start timing of the third fuel injection operation F3 is set to be earlier than the start timing of the second fuel injection operation F2. Furthermore, the start timing of the fourth fuel injection operation F4 is set to be earlier than the start timing of the third fuel injection operation F3. After the fourth fuel injection operation F4 is executed, and the complete combustion sequence (a state where the combustion is performed once in each of the cylinders 2A to 2D) of the engine is executed, the normal control based on the accelerator opening degree is performed. Therefore, the fifth fuel injection operation and subsequent operations are not shown.

Figure 7:
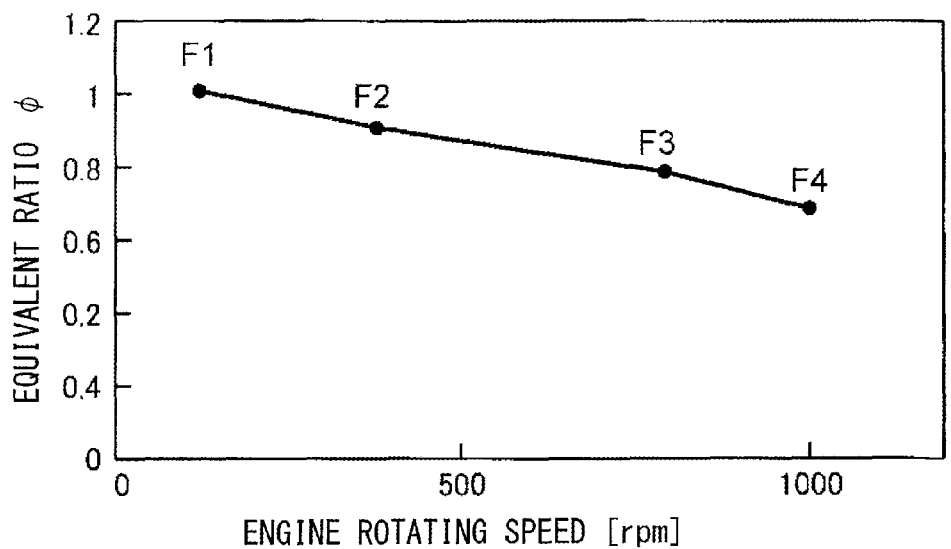
FIG. 7 is a graph showing: respective equivalent ratios based on the fuel injection operations performed at the time of the first compression start; and respective engine rotating speeds at the time of the fuel injection operations.

FIG. 7 is a graph showing a relation between the engine rotating speed when the fuel is injected into each of the cylinders 2A to 2D at the time of the first compression start and an equivalent ratio φ of the air-fuel mixture generated in the cylinder based on each of the fuel injection operations (F1 to F4). The equivalent ratio φ is a value obtained by dividing a theoretical air-fuel ratio of the air-fuel mixture by an actual air-fuel ratio. When the amount of fuel injected corresponds to the theoretical air-fuel ratio (i.e., when the amount of fuel injected is not too much and not too little relative to the amount of air in the cylinder), the equivalent ratio φ becomes one. When the amount of fuel injected is smaller than the amount corresponding to the theoretical air-fuel ratio, the equivalent ratio φ becomes less than one. As shown in FIG. 7, the equivalent ratio φ gradually decreases as the number of times the fuel injection operation is executed increases (in other words, as the engine rotating speed increases). To be specific, in the fuel injection operation F1 with respect to the stopped-in-compression-stroke cylinder 2C that is the first fuel injection operation at the time of the first compression start, the amount of fuel injected is set such that the equivalent ratio φ becomes one. However, in the second, third, and fourth fuel injection operations F2, F3, and F4 (i.e., in the fuel injection operations with respect to the cylinders 2D, 2B, and 2A), the amount of fuel injected is adjusted such that the equivalent ratio φ becomes less than one. In addition, as the fuel injection operations proceed in order of the second, third, and fourth fuel injection operations, the equivalent ratio φ gradually decreases in a range of less than one. In the example of FIG. 7, the equivalent ratio φ at the time of the first fuel injection operation F1 is one, and the equivalent ratios φ at the time of the second, third, and fourth fuel injections F2, F3, and F4 are 0.9, 0.8, and 0.7, respectively.

(5) Actions, Etc.

As explained above, the present embodiment adopts the following characteristic configurations in the engine which can perform the HCCI combustion (homogeneous-charge compression ignition combustion) and has the idling stop function, the HCCI combustion being combustion in which the air-fuel mixture is self-ignited by the compression of the piston 5 while mixing the air with the fuel injected from the injector 15 into each of the cylinders 2A to 2D.

When the predetermined restart condition is satisfied after the engine is automatically stopped, whether or not the piston 5 of the stopped-in-compression-stroke cylinder 2C which is in the compression stroke falls within the specific range Rx (FIG. 3) set at the bottom dead center side of the predetermined upper limit position X is determined. When the piston 5 of the stopped-in-compression-stroke cylinder 2C falls within the specific range Rx, the first compression start, in which the fuel is injected from the injector 15 into the stopped-in-compression-stroke cylinder 2C for the first time and is then self-ignited, is performed. In the first compression start, the start timing of the first fuel injection operation F1 with respect to the cylinder 2C is set to be earlier as the stop position of the piston of the stopped-in-compression-stroke cylinder 2C gets closer to the bottom dead center within the specific range Rx (see FIG. 5). As explained below, this configuration is advantageous in that when restarting the engine, the expansion energy by the combustion can be efficiently transferred to the piston 5, and therefore, the quickness of the start can be improved.

To be specific, in the above embodiment, at the time of the first compression start in which the fuel is injected into the stopped-in-compression-stroke cylinder 2C for the first time and is self-ignited, the start timing of the first fuel injection operation F1 is set to be earlier as the stop position of the piston of the stopped-in-compression-stroke cylinder 2C gets closer to the bottom dead center, that is, as a compression allowance of the piston 5 (i.e., a stroke amount from the stop position of the piston to the compression top dead center) is larger. As a result, a timing at which the increase in temperature in the cylinder 2C slows down by the latent heat of vaporization of the injected fuel becomes earlier. As above, when a condition is such that the temperature in the cylinder 2C easily increases, the start timing of the fuel injection operation is adjusted such that the temperature increase is suppressed. Therefore, even if the stop position of the piston of the stopped-in-compression-stroke cylinder 2C varies in the range (specific range Rx) where the first compression start can be executed, the timing at which the temperature in the cylinder 2C increases to reach a temperature (ignition start temperature) necessary for the self-ignition of the air-fuel mixture can be set to the vicinity of a specific crank angle (for example, the vicinity of the compression top dead center). With this, for example, the air-fuel mixture can always be combusted at the timing at which the expansion energy by the combustion is most efficiently transmitted to the piston 5. Thus, the piston 5 can be powerfully pushed down, and therefore, high rotational force can be applied to the engine. Thus, the quickness when restarting the engine can be effectively improved.

Figure 8:
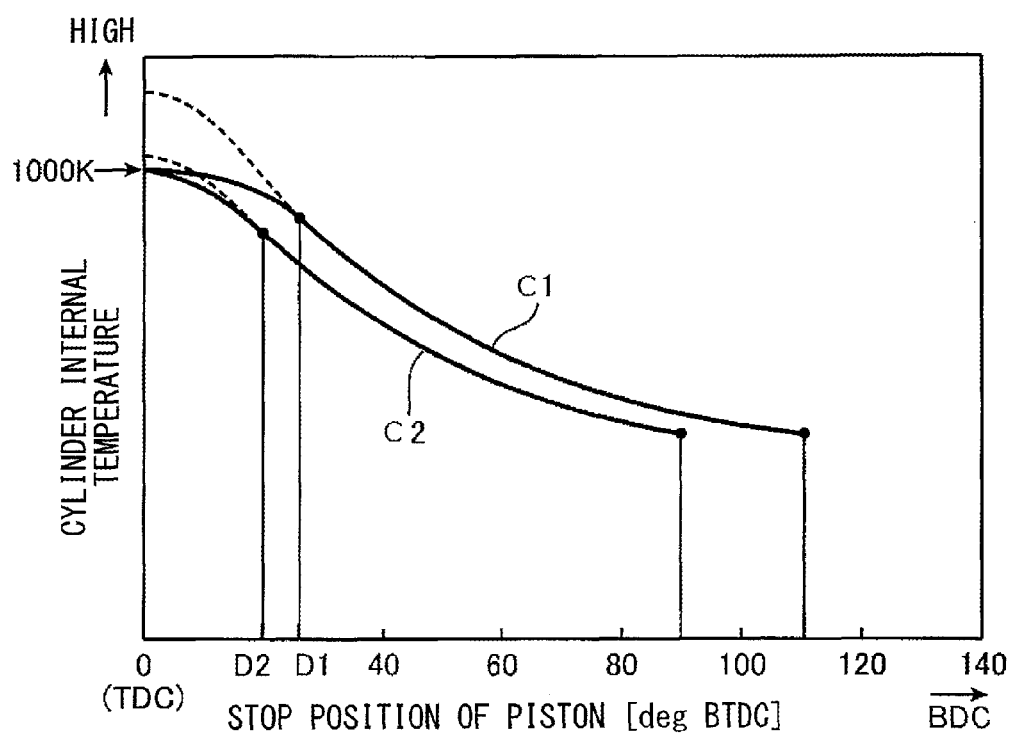
FIG. 8 is a graph showing a relation between a crank angle of the stopped-in-compression-stroke cylinder and a cylinder internal temperature of the stopped-in-compression-stroke cylinder in the case of each of two different stop positions of the piston of the stopped-in-compression-stroke cylinder.

FIG. 8 is a graph showing a comparison between the change in the temperature (cylinder internal temperature) in the cylinder 2C when the stop position of the piston of the cylinder 2C is 110° CA before the top dead center and the piston 5 of the stopped-in-compression-stroke cylinder 2C moves up from the stop position to the compression top dead center at the time of the first compression start and the change in the temperature (cylinder internal temperature) in the cylinder 2C when the stop position of the piston of the cylinder 2C is 90° CA before the top dead center and the piston 5 of the stopped-in-compression-stroke cylinder 2C moves up from the stop position to the compression top dead center at the time of the first compression start. These stop positions (110° CA and 90° CA before the top dead center) of the piston are within a crank angle range from X to Y shown in FIG. 5. Therefore, these stop positions of the piston are also within the specific range Rx where the first compression start can be executed.

Specifically, in the graph of FIG. 8, a case where the stop position of the piston is 110° CA before the top dead center is a case C1, and a case where the stop position of the piston is 90° CA before the top dead center is a case C2. In each of these cases, the change in the cylinder internal temperature in accordance with the move-up of the piston is plotted. In the graph of FIG. 8, a crank angle D1 of the horizontal axis corresponds to the fuel injection operation start timing set in the case C1 (where the stop position of the piston is 110° CA before the top dead center), and a crank angle D2 of the horizontal axis corresponds to the fuel injection operation start timing set in the case C2 (where the stop position of the piston is 90° CA before the top dead center). Further, a broken line shows the cylinder internal temperature when the fuel injection operation is not executed at the timing (i.e., when only the air is compressed), and a solid line shows the cylinder internal temperature when the fuel injection operation is executed.

As shown in FIG. 8, the cylinder internal temperature (broken line) when the fuel injection operation is not executed in the case C1 where the stop position of the piston is 110° CA before the top dead center is higher than that in the case C2 where the stop position of the piston is 90° CA before the top dead center. Especially, the cylinder internal temperature when the stop position of the piston is the compression top dead center (0° CA before the top dead center) in the case C1 is significantly higher than that in the case C2. This is because since the compression of the piston 5 in the case C1 (where the stop position of the piston is 110° CA before the top dead center) is started earlier than in the case C2, a period of heating by the compression in the case C1 becomes longer.

On the other hand, when the fuel injection operation is executed, that is, when the fuel injection operation is started at the crank angle D1 in the case C1 or when the fuel injection operation is started at the crank angle D2 in the case C2, as shown by the solid lines in FIG. 8, the cylinder internal temperature after the fuel injection operation is started is lower than that when the fuel injection operation is not executed. To be specific, because of the fuel injection operation, an increase speed of the cylinder internal temperature slows down, and the cylinder internal temperature hardly increases. This is because since the fuel is injected into the cylinder, a target of the compression by the piston 5 is changed from the air to the air-fuel mixture (mixture of air and fuel), and therefore, specific heat of the compression target increases.

It should be noted that the crank angle D1 corresponding to the fuel injection operation start timing in the case C1 (where the stop position of the piston is 110° CA before the top dead center) is set to be earlier than the crank angle D2 corresponding to the fuel injection operation start timing in the case C2 (where the stop position of the piston is 90° CA before the top dead center). As above, the start timing of the fuel injection operation is set to be earlier as the stop position of the piston gets closer to the bottom dead center. Therefore, as the compression allowance of the piston 5 becomes larger, that is, as the period (period from when the piston moves from the stop position to the compression top dead center) of the heating by the compression becomes longer, the timing at which the increase in the cylinder internal temperature slows down by the vaporization latent heat of the injected fuel becomes earlier. As a result, even in either of the cases C1 and C2, that is, even in either of a case where the stop position of the piston is 110° CA before the top dead center and a case where the stop position of the piston is 90° CA before the top dead center, the cylinder internal temperature increases to a specific temperature (herein, about 1,000 K) when the piston position reaches the compression top dead center. The temperature 1,000 K substantially coincides with a temperature (ignition start temperature) necessary for the self-ignition of the air-fuel mixture. Therefore, in the example shown in FIG. 8, in either of these cases which are different from each other regarding the stop position of the piston, the air-fuel mixture is self-ignited in the vicinity of the compression top dead center. When the air-fuel mixture is self-ignited in the vicinity of the compression top dead center, subsequent compression ignition combustion becomes combustion in which the combustion gravity center (a timing at which 50% of the fuel in the cylinder finishes combusting) is reached when the piston slightly passes through the compression top dead center, that is, when the combustion gravity center is reached, for example, in the vicinity of 5° CA after a top dead center (ATDC). When such combustion occurs, the expansion energy due to the combustion acts on the piston 5 which has just passed through the top dead center. With this, the energy is efficiently converted into the push-down force of the piston 5, and therefore, a piston speed is significantly increased. The combustion gravity center desirable for adequately generating the push-down force of the piston 5 is not limited to 5° CA after the top dead center and may fall within a range of at least 5±5° CA after the top dead center.

In the above embodiment, the start timing of the fuel injection operation with respect to the stopped-in-compression-stroke cylinder 2C at the time of the first compression start is set to be earlier as the stop position of the piston of the cylinder 2C gets closer to the bottom dead center. Therefore, the air-fuel mixture can be combusted at a proper timing at which the expansion energy by the combustion is efficiently transmitted to the piston 5. Thus, the quickness of the engine start can be effectively improved.

In the above embodiment, the amount of fuel injected in the first fuel injection operation F1 with respect to the stopped-in-compression-stroke cylinder 2C at the time of the first compression start is set to such a value that the equivalent ratio φ of the air-fuel mixture becomes one (see FIG. 7). According to this configuration, the first combustion in the stopped-in-compression-stroke cylinder 2C becomes a highly-efficient combustion at the theoretical air-fuel ratio. Therefore, the high rotational force can be applied to the engine by the first combustion, and this can further improve the quickness of the start.

Figure 9A:
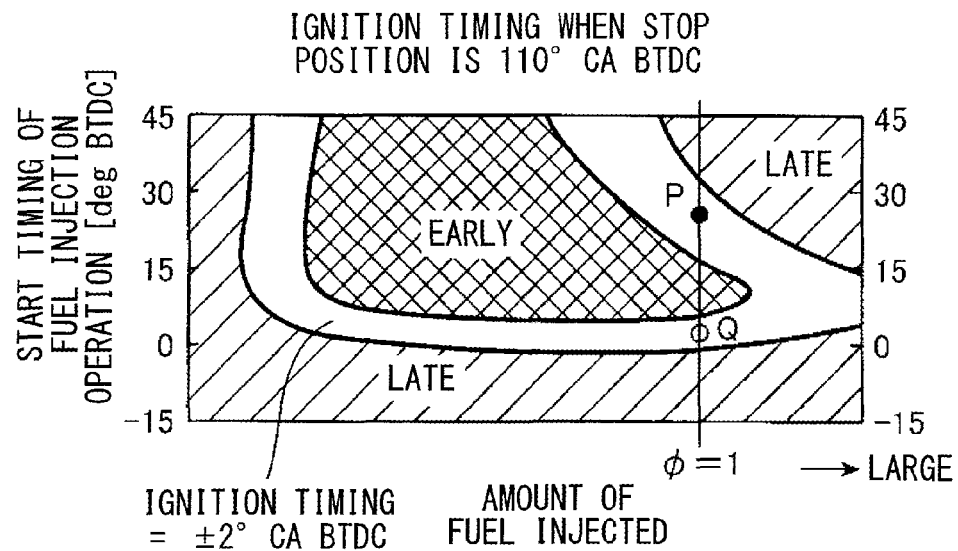
FIG. 9A is a graph showing a start timing (ignition timing of an air-fuel mixture) of a first combustion which occurs in the stopped-in-compression-stroke cylinder at the time of the first compression start, in relation to the amount of fuel injected and the start timing of the fuel injection operation, and shows that the stop position of the piston of the stopped-in-compression-stroke cylinder is 110° CA before a compression top dead center.
Figure 9B:
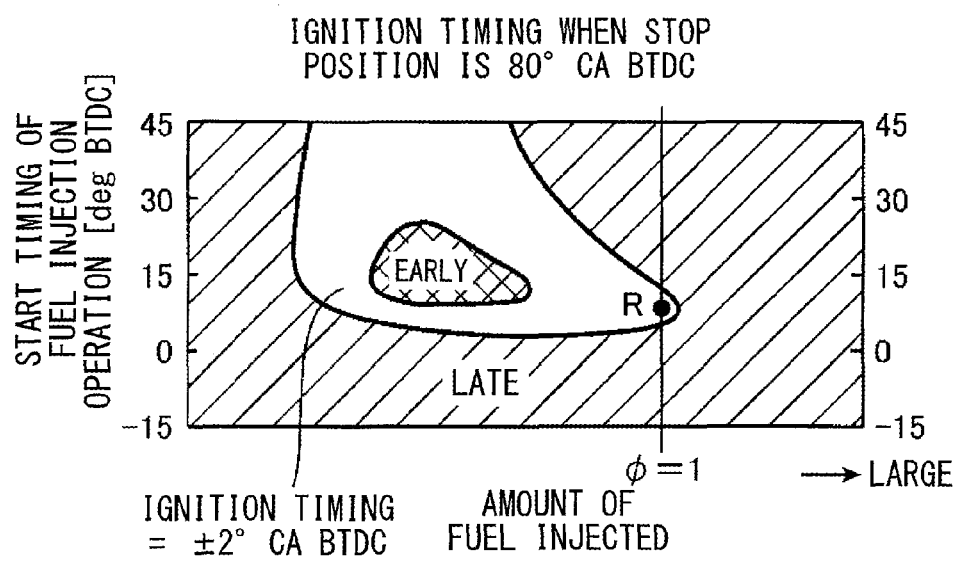
FIG. 9B is a graph showing the start timing (ignition timing of the air-fuel mixture) of the first combustion which occurs in the stopped-in-compression-stroke cylinder at the time of the first compression start, in relation to the amount of fuel injected and the start timing of the fuel injection operation, and shows that the stop position of the piston of the stopped-in-compression-stroke cylinder is 80° CA before the compression top dead center.

FIGS. 9A and 9B are graphs each showing the start timing of the first combustion (i.e., the ignition timing of the air-fuel mixture) in the stopped-in-compression-stroke cylinder 2C at the time of the first compression start in relation to the amount of fuel injected and the start timing of the fuel injection operation. FIG. 9A shows a case when the stop position of the piston of the stopped-in-compression-stroke cylinder 2C is 110° CA before the top dead center, and FIG. 9B shows a case when the stop position of the piston of the stopped-in-compression-stroke cylinder 2C is 80° CA before the top dead center. In each graph, a white region where there is no hatching is a region where the ignition timing falls within a range from 2° CA before the top dead center to 2° CA after the top dead center (±2° CA before the top dead center). A hatching region at an inner side of the white region is a region where the ignition timing is earlier than the above angular range, and a hatching region at an outer side of the white region is a region where the ignition timing is later than the above angular range. According to the engine used to obtain experiment results of FIGS. 9A and 9B, the crank angle corresponding to the limit stop position at which the first compression start is allowed, that is, the crank angle corresponding to the upper limit position X (FIG. 3) is 80° CA before the top dead center. Therefore, FIG. 9B shows the results at the limit stop position at which the first compression start can be executed, and FIG. 9A shows results when a space for the stop position of the piston is larger than that of FIG. 9B (i.e., when the stop position of the piston is closer to the bottom dead center).

As shown in FIG. 9A, in order that the ignition timing falls within the range (white region) from 2° CA before the top dead center to 2° CA after the top dead center in a case where the stop position of the piston is 110° CA before the top dead center and the fuel, the amount of which is set such that the equivalent ratio φ becomes one, is injected, the start timing of the fuel injection operation may be set to a point P or Q. When the start timing of the fuel injection operation is set to the point Q, the fuel is injected at a timing considerably close to the compression top dead center (i.e., the fuel is injected in a state where the temperature in the cylinder is considerably high), so that the fuel is self-ignited in a short period of time after the start of the injection. As above, when a period (ignition delay time) from the injection start until the self-ignition is too short, the combustion occurs in a state where the distribution of the fuel in the cylinder is significantly biased (i.e., in a state where an excessively fuel-rich or fuel-lean region is generated). As a result, the amounts of HC, CO, and NOx generated and the amount of soot generated increase, and an emission performance deteriorates. Therefore, it is desirable that the start timing of the fuel injection operation be a timing corresponding to the point P located at an earlier side of the point Q. In this example, the timing corresponding to the point P is about 25° CA before the top dead center. With this, the ignition delay time is adequately secured, and the combustion with excellent emission performance is realized. According to studies of the present inventors, to satisfy the emission performance, the ignition delay time needs to be at least 3 msec. The fuel injection operation start timing that is about 25° CA before the top dead center adequately satisfies this requisite condition.

On the other hand, as shown in FIG. 9B, in order that the ignition timing falls within the range from 2° CA before the top dead center to 2° CA after the top dead center in a case where the stop position of the piston is 80° CA before the top dead center and the fuel, the amount of which is set such that the equivalent ratio $\varphi$ becomes one, is injected, the start timing of the fuel injection operation may be set to a point R. In this example, the timing corresponding to the point R is about 10° CA before the top dead center and is later than that in the above case (case where the stop position of the piston is 110° CA before the top dead center) of FIG. 9A. Even in this case, 3 msec or more is secured as the period (ignition delay time) from the injection start until the self-ignition. Therefore, the necessary emission performance is secured.

As can be understood from the results shown in FIGS. 9A and 9B, in order to set the ignition timing of the air-fuel mixture to the vicinity of the compression top dead center (in this example, from 2° CA before the top dead center to 2° CA after the top dead center) under a condition where the equivalent ratio $\varphi$ is one; and secure the emission performance, the start timing of the fuel injection operation needs to be changed in accordance with the stop position of the piston of the stopped-in-compression-stroke cylinder 2C, that is, the start timing of the fuel injection operation in a case where the stop position of the piston is closer to the bottom dead center needs to be set to be later than that in a case where the stop position of the piston is farther away from the bottom dead center (in other words, the start timing of the fuel injection operation needs to be set to be earlier as the stop position of the piston gets closer to the bottom dead center). In the above embodiment, the start timing of the fuel injection operation shown in FIG. 5 is adopted because of these circumstances. Therefore, as shown in FIG. 5, the ignition timing of the air-fuel mixture is set to the vicinity of the compression top dead center regardless of the stop position of the piston of the stopped-in-compression-stroke cylinder 2C. When the ignition timing is set as above, the combustion gravity center falls within a predetermined range around 5° CA after the top dead center (corresponding to a scale "−5" on the vertical axis of FIG. 5). In FIG. 5, the combustion gravity center falls within a range of at least 5±5° CA after the top dead center.

Regarding the fuel injection operation start timings shown in FIG. 5, the stop position of the piston of the stopped-in-compression-stroke cylinder 2C changes, but the other conditions are constant. In other words, the start timing of the fuel injection operation with respect to the stopped-in-compression-stroke cylinder 2C can be changed in consideration of the factors other than the stop position of the piston. One example is shown in FIG. 10.

Figure 10:
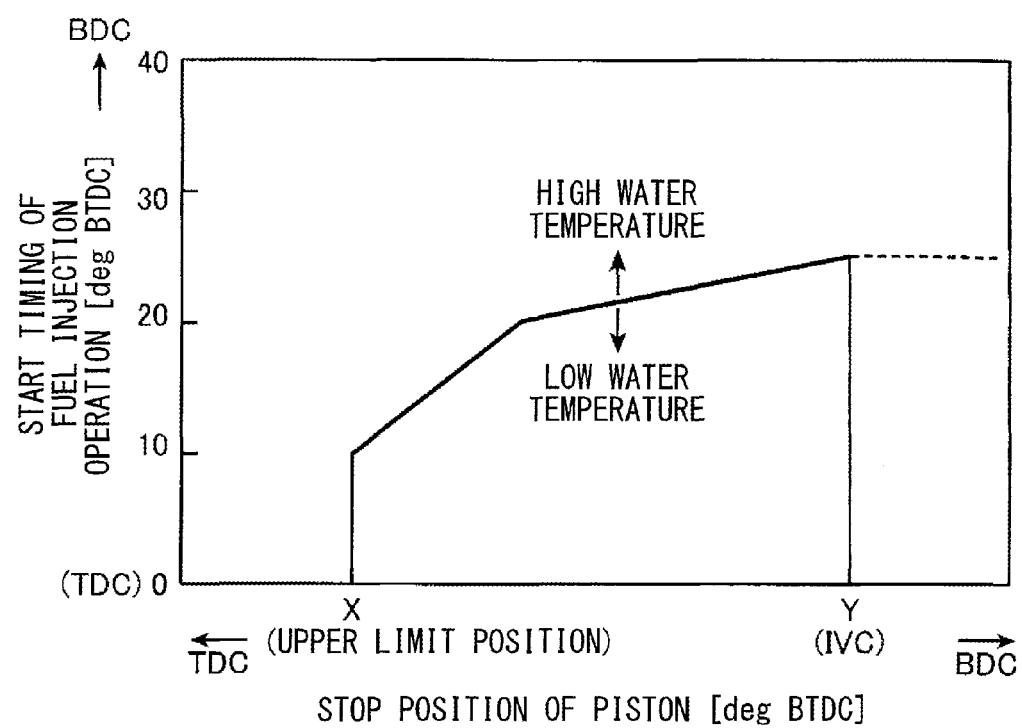
FIG. 10 is a graph showing an example in which the start timing of the first fuel injection operation at the time of the first compression start is variably set depending on a temperature of coolant of the engine.

In the example of FIG. 10, the start timing of the first fuel injection operation F1 (fuel injection operation with respect to the stopped-in-compression-stroke cylinder 2C) at the time of the first compression start is variably set depending on the temperature of the coolant of the engine. More specifically, in a case where the start timing of the fuel injection operation F1 when the temperature of the coolant of the engine is a standard temperature (80° C., for example) during a warm operation is shown by a solid line in FIG. 10, the start timing of the fuel injection operation when the temperature of the coolant is higher than the standard temperature is set to an earlier side of the solid line (i.e., a side closer to the BDC) as a whole, and the start timing of the fuel injection operation when the temperature of the coolant is lower than the standard temperature is set to a later side of the solid line (i.e., a side closer to the TDC) as a whole. In other words, when the stop position of the piston of the stopped-in-compression-stroke cylinder 2C is constant, the start timing of the first fuel injection operation F1 at the time of the first compression start is set to be earlier as the temperature of the coolant of the engine becomes higher. This is advantageous in that even if the temperature of the coolant slightly varies, the air-fuel mixture can be combusted at a proper timing.

To be specific, when the temperature of the coolant of the engine is high, an initial temperature of the air compressed in the cylinder becomes high. Therefore, in order to increase the cylinder internal temperature in the vicinity of the compression top dead center to a substantially constant temperature, the start timing of the fuel injection operation needs to be set to be earlier, and the increase speed of the cylinder internal temperature needs to be suppressed from an earlier timing based on the fuel injection operation. In consideration of this, in the example of FIG. 10, the start timing of the fuel injection operation is set to be earlier as the temperature of the coolant of the engine becomes higher. With this, even if the temperature of the coolant slightly varies, the air-fuel mixture can always be combusted at a proper timing, and the expansion energy by the combustion can be efficiently transmitted to the piston 5.

In the above embodiment, when it is determined that the piston 5 of the stopped-in-compression-stroke cylinder 2C is stopped at the top dead center side of the upper limit position X, the second compression start is executed at the time of subsequent engine restart, the second compression start being start in which the fuel is injected into the stopped-in-intake-stroke cylinder 2D for the first time and is self-ignited, the stopped-in-intake-stroke cylinder 2D executing the compression stroke after the compression stroke of the stopped-in-compression-stroke cylinder 2C. According to this configuration, in a state where the compression allowance cannot be adequately secured since the piston 5 of the stopped-in-compression-stroke cylinder 2C is relatively close to the top dead center, the fuel is injected for the first time into not the stopped-in-compression-stroke cylinder 2C but the stopped-in-intake-stroke cylinder 2D and is self-ignited, the stopped-in-intake-stroke cylinder 2D executing the compression stroke after the compression stroke of the stopped-in-compression-stroke cylinder 2C. Therefore, the engine can be surely restarted without causing misfire.

To be specific, when the piston 5 of the stopped-in-compression-stroke cylinder 2C is stopped at the top dead center side of the upper limit position X, the compression allowance of the piston 5 is small. Therefore, even if the piston 5 moves up to the top dead center, the air in the cylinder does not adequately increase in temperature. Therefore, even if the fuel is injected into the stopped-in-compression-stroke cylinder 2C, the misfire may occur. However, in the above embodiment, in such a case, the fuel is injected into not the stopped-in-compression-stroke cylinder 2C but the stopped-in-intake-stroke cylinder 2D (i.e., the cylinder which can adequately secure the compression allowance in the compression stroke) and is self-ignited. Thus, the injected fuel can be surely combusted, and therefore, the engine can be restarted.

In the above embodiment, the equivalent ratio φ based on the first fuel injection operation F1 at the time of the first compression start is set to one, and the equivalent ratios φ in the second and subsequent fuel injection operations (F2, F3, and F4) are gradually reduced within a range of less than one. However, the equivalent ratio φ may be uniformly set to one until the complete combustion sequence of the engine is achieved. With this, the engine rotating speed can be adequately increased in a shorter period of time. However, as shown in FIG. 6, in the above embodiment, the start timing of the fuel injection operation is set to be gradually earlier as the number of times the fuel injection operation is executed increases. Therefore, when the equivalent ratio φ is uniformly set to one as above, abnormal combustion called preignition in which the ignition timing of the air-fuel mixture becomes too early may occur. In the above embodiment, to surely avoid such abnormal combustion, the amount of fuel injected is made smaller as the number of times the fuel injection operation is executed becomes larger. Thus, the equivalent ratio φ is gradually reduced.

In the above embodiment, whether or not each of the engine automatic stop condition and the restart condition is satisfied is determined in accordance with the requisite conditions regarding the operations of the accelerator pedal 36 and the brake pedal 37. This mainly considers automatic transmission cars including automatic transmissions. Requisite conditions different from the above requisite conditions may be adopted in cases other than that of automatic transmission cars, that is, in cases of manual transmission cars including manual transmissions. For example, regarding the automatic stop condition, a necessary condition in which a shift stage of the manual transmission is neutral and a necessary condition in which a clutch pedal is released may be set instead of the requisite condition in which the accelerator is turned off and the requisite condition in which the brake is turned on. Further, regarding the restart condition, a requisite condition in which the clutch pedal is pressed may be set instead of the requisite condition in which the accelerator is turned on or the requisite condition in which the brake is turned off.

REFERENCE CHARACTER LIST

| 1 | engine main body |
|---|---|
| 2A to 2D | cylinder |
| 5 | piston |
| 15 | injector |
| 51 | automatic stop control portion |
| 52 | stop position determining portion |
| 53 | restart control portion |
| X | upper limit position |
| Rx | specific range |

The invention claimed is:

1. A start control device provided on a homogeneous-charge compression ignition engine,
the homogeneous-charge compression ignition engine including a plurality of cylinders, pistons provided at the respective cylinders so as to reciprocate, and injectors configured to inject fuel to the respective cylinders,
the homogeneous-charge compression ignition engine performing homogeneous-charge compression ignition combustion in which the fuel injected into the cylinder from the injector before a compression top dead center is mixed with air and is then self-ignited by compression of the piston,
the start control device comprising:
an automatic stop control portion configured to automatically stop the engine when a predetermined automatic stop condition is satisfied;
a stop position determining portion configured to determine whether or not the piston of a stopped-in-compression-stroke cylinder that is the cylinder which is in a compression stroke at the automatic stop of the engine falls within a specific range set at a bottom dead center side of a predetermined upper limit position; and
a restart control portion configured to execute a first compression start when it is determined that the piston of the stopped-in-compression-stroke cylinder is stopped within the specific range and a predetermined restart condition is satisfied, the first compression start being the start in which the fuel is injected into the stopped-in-compression-stroke cylinder from the injector for the first time and is then self-ignited, and combustion is restarted from when the compression stroke is achieved for the first time in the entire engine, wherein
the restart control portion sets a start timing of a first fuel injection operation with respect to the stopped-in-compression-stroke cylinder to be earlier as a stop position of the piston of the stopped-in-compression-stroke cylinder gets closer to the bottom dead center within the specific range.

2. The start control device according to claim 1, wherein the restart control portion sets at least the start timing of the first fuel injection operation with respect to the stopped-in-compression-stroke cylinder among start timings of fuel injection operations at a time of the first compression start to such a timing that a combustion gravity center of the compression ignition combustion in the stopped-in-compression-stroke cylinder falls within 5±5° CA after a compression top dead center.

3. The start control device according to claim 1, wherein the restart control portion sets at least an amount of fuel injected into the stopped-in-compression-stroke cylinder for the first time among amounts of fuel injected at the time of the first compression start to such an amount that an equivalent ratio of an air-fuel mixture in the cylinder becomes one.

4. The start control device according to claim 1, wherein when the stop position of the piston of the stopped-in-compression-stroke cylinder stays at a same position within the specific range, the restart control portion sets at least the start timing of the first fuel injection operation with respect to the stopped-in-compression-stroke cylinder among start timings of fuel injection operations at the time of the first compression start to be earlier as a temperature of coolant of the engine becomes higher.

5. The start control device according to claim 1, wherein when it is determined that the piston of the stopped-in-compression-stroke cylinder is stopped at a top dead center side of the upper limit position, the restart control portion executes a second compression start in which: after a stopped-in-intake-stroke cylinder that is the cylinder which is in an intake stroke at the automatic stop of the engine is shifted to the compression stroke, the fuel is injected for the first time into the stopped-in-intake-stroke cylinder and is then self-ignited; and the combustion is restarted from when the compression stroke is achieved for a second time in the entire engine.

6. The start control device according to claim 2, wherein the restart control portion sets at least an amount of fuel injected into the stopped-in-compression-stroke cylinder for the first time among an amount of fuel injected at the time of the first compression start to such an amount that an equivalent ratio of an air-fuel mixture in the cylinder becomes one.

7. The start control device according to claim 2, wherein when the stop position of the piston of the stopped-in-compression-stroke cylinder stays at a same position within the specific range, the restart control portion sets at least the start timing of the first fuel injection operation with respect to the stopped-in-compression-stroke cylinder among start timings of fuel injection operations at the time of the first compression start to be earlier as a temperature of coolant of the engine becomes higher.

8. The start control device according to claim 3, wherein when the stop position of the piston of the stopped-in-compression-stroke cylinder stays at a same position within the specific range, the restart control portion sets at least the start timing of the first fuel injection operation with respect to the stopped-in-compression-stroke cylinder among start timings of fuel injection operations at the time of the first compression start to be earlier as a temperature of coolant of the engine becomes higher.

9. The start control device according to claim 2, wherein when it is determined that the piston of the stopped-in-compression-stroke cylinder is stopped at a top dead center side of the upper limit position, the restart control portion executes a second compression start in which: after a stopped-in-intake-stroke cylinder that is the cylinder which is in an intake stroke at the automatic stop of the engine is shifted to the compression stroke, the fuel is injected for the first time into the stopped-in-intake-stroke cylinder and is then self-ignited; and the combustion is restarted from when the compression stroke is achieved for the second time in the entire engine.

10. The start control device according to claim 3, wherein when it is determined that the piston of the stopped-in-compression-stroke cylinder is stopped at a top dead center side of the upper limit position, the restart control portion executes a second compression start in which: after a stopped-in-intake-stroke cylinder that is the cylinder which is in an intake stroke at the automatic stop of the engine is shifted to the compression stroke, the fuel is injected for the first time into the stopped-in-intake-stroke cylinder and is then self-ignited; and the combustion is restarted from when the compression stroke is achieved for the second time in the entire engine.

11. The start control device according to claim 4, wherein when it is determined that the piston of the stopped-in-compression-stroke cylinder is stopped at a top dead center side of the upper limit position, the restart control portion executes a second compression start in which: after a stopped-in-intake-stroke cylinder that is the cylinder which is in an intake stroke at the automatic stop of the engine is shifted to the compression stroke, the fuel is injected for the first time into the stopped-in-intake-stroke cylinder and is then self-ignited; and the combustion is restarted from when the compression stroke is achieved for the second time in the entire engine.

* * * * *